July 11, 1967  E. S. KRESS  3,330,429
POT HANDLING TRAILER
Filed July 15, 1965  3 Sheets-Sheet 1

INVENTOR.
Edward S. Kress,
BY
Wolfe, Hubbard, Voit + Osann
ATTORNEYS.

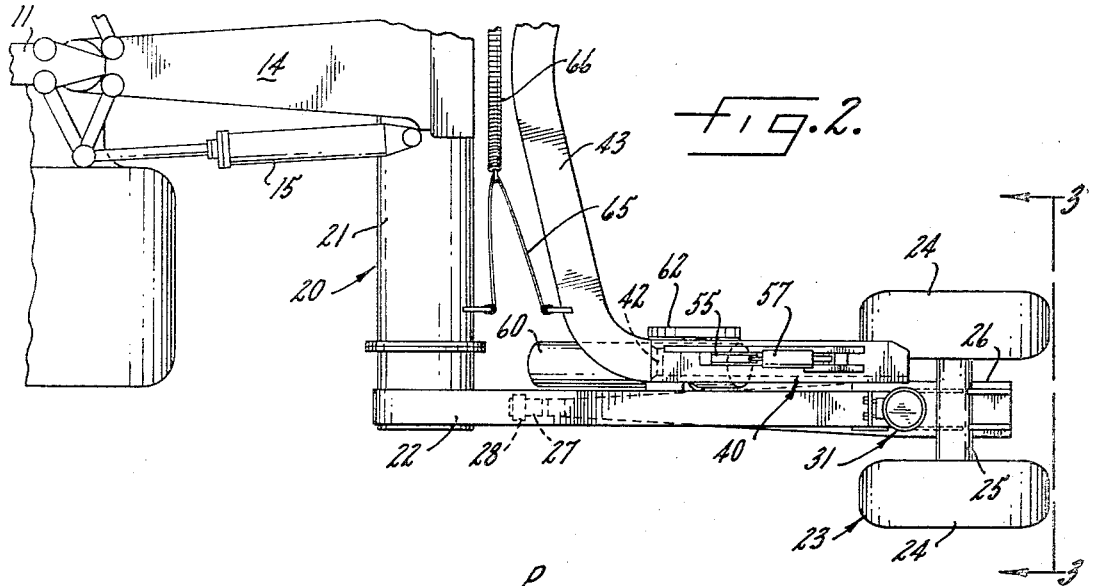
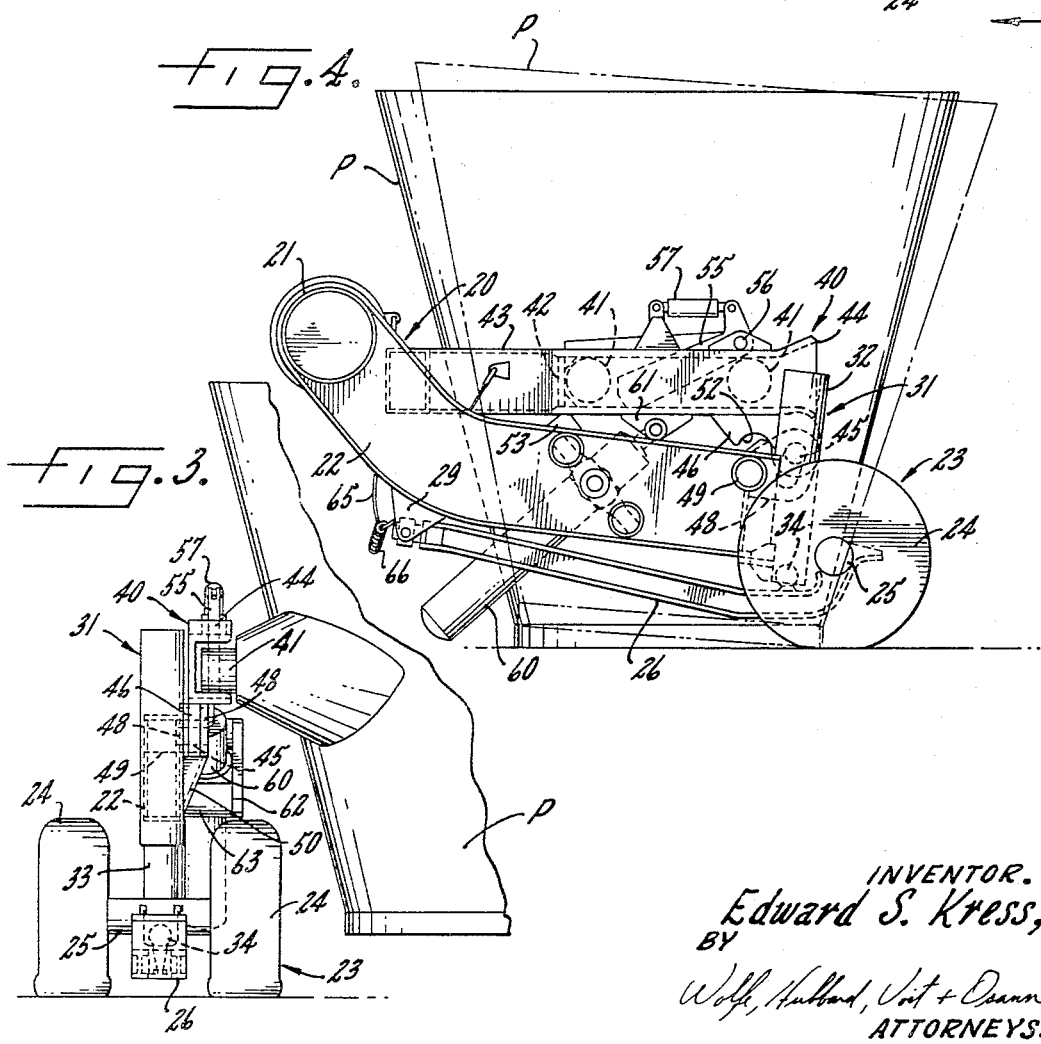

July 11, 1967

E. S. KRESS 3,330,429

POT HANDLING TRAILER

Filed July 15, 1965

INVENTOR.
Edward S. Kress
BY
Wolfe, Hubbard, Voit & Osann
ATTORNEYS.

United States Patent Office 3,330,429
Patented July 11, 1967

3,330,429
POT HANDLING TRAILER
Edward S. Kress, 5617 N. Fairmount Drive,
Peoria, Ill. 61614
Filed July 15, 1965, Ser. No. 472,102
9 Claims. (Cl. 214—314)

This invention relates generally to wheeled supports for transporting heavy loads and more particularly concerns a vehicle for handling ladles or "pots" of the kind used in the steel-making industry.

It is the primary aim of the invention to provide a trailer-type vehicle capable of efficiently picking up, carrying and dumping large, heavy pots of steel or slag. A vessel of this kind filled with molten material can weigh over 100 tons. While for convenience the term "pot" has been used herein to designate the load being handled, it will clear that the invention can be advantageously used to handle any kind of bin or container whose size and weight normally present problems in transport and handling.

An object of the invention is also to provide a trailer as referred to above which does not attempt to lift a heavy load cantilever fashion but rather surrounds the load so that the weight is balanced and distributed to all of the ground engaging wheels.

Another object of the invention is to provide a trailer of the above kind having a rapid self-loading action not dependent on crane or winching arrangements. A related object is to provide a trailer of this type which lifts the load carried only enough to establish running clearance so that the center of gravity of the assembly remains low.

A further object is to provide a trailer as characterized above which is of lightweight, simple design so as to be economical to manufacture and maintain.

It is also an object to provide a trailer as described above which reliably and positively secures a pot in proper position for transport. Moreover, it is an object to provide such a trailer with resilient, soft riding characteristics despite the heavy loads transported.

A still further object is to provide a tractor of the above character which, in the event of a failure of some kind, i.e., tire, engine, hydraulic, etc., permits the load to be dropped and picked up promptly by another vehicle. When molten metal is being handled this is of particular importance.

Other objects and advantages of the invention will become apparent upon reading the following detailed description and upon reference to the drawings, in which:

FIG. 2 is a fragmentary plan of the vehicle shown in FIG. 1;

FIG. 3 is a fragmentary rear elevation taken approximately along the line 3—3 in FIG. 2;

FIG. 4 is a fragmentary view corresponding to FIG. 1 but showing the parts in an alternate operating position.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
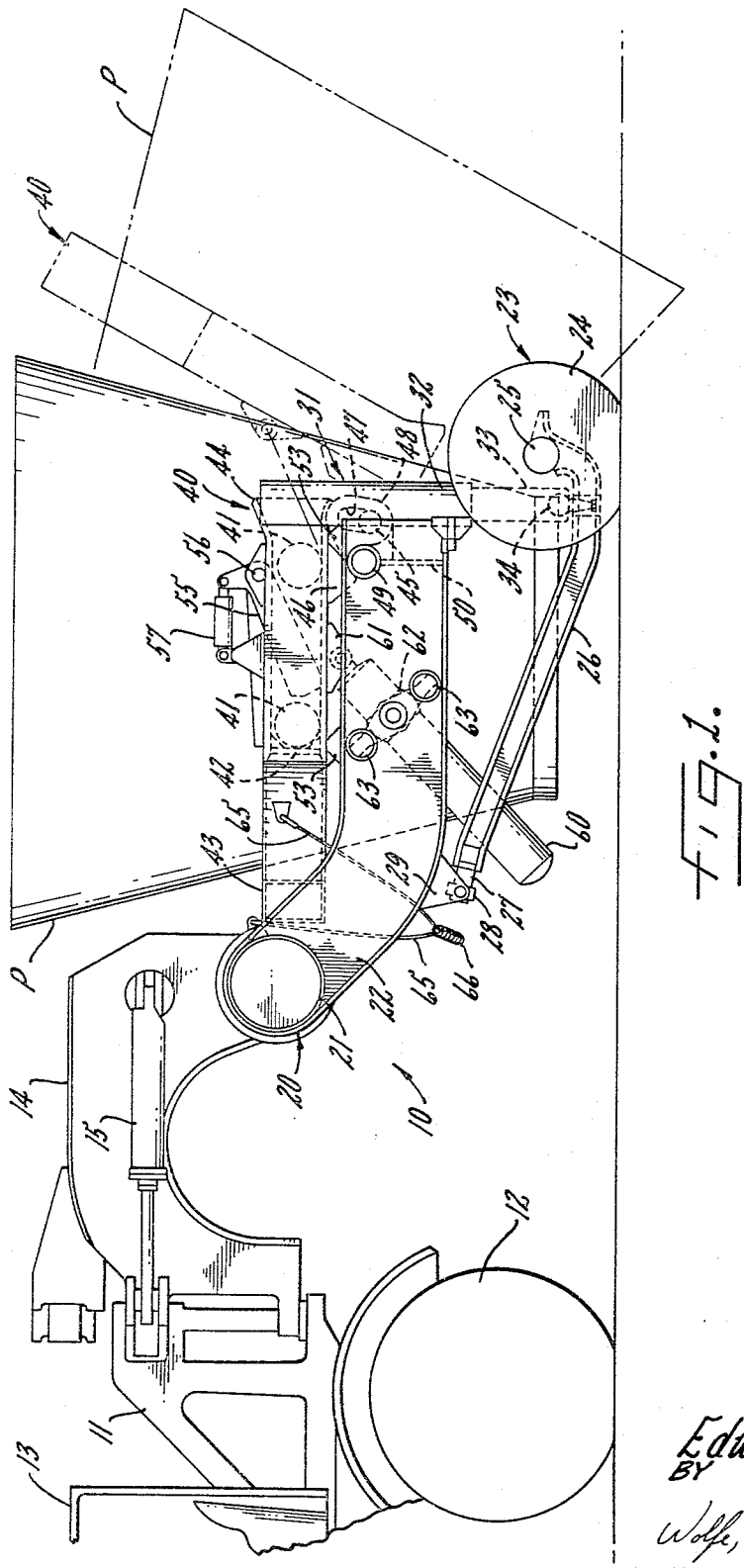
FIGURE 1 is a side elevation of a vehicle constructed in accordance with the invention.

Turning to FIG. 1, there is shown a vehicle 10 embodying the invention and coupled in trailer fashion to a single axle prime mover or tractor 11 having driving wheels 12 and a forward operator's cab 13. The vehicle 10 includes a goose neck 14 which is pivoted about a vertical axis on the tractor 11. A pair of steering actuators 15 are pivoted one on either side of the goose neck 14 and are anchored on the tractor 11 so as to permit swinging of the tractor from side to side relative to the trailer vehicle 10 and thus give the assembly a steering capability.

The vehicle 10 includes a rigid, generally U-shaped frame 20 defined by a cross beam 21 and a pair of rearwardly extending arms 22 that embrace a cup-shaped pot P which, for illustrative purposes, will be considered the load handled by the vehicle 10. The arms 22 are built up in box-like fashion for strength and rigidity. Ground engaving wheel sets 23 are mounted at each side of the vehicle 10 underneath the ends of the arms 22 and since the sets 23 are identical only one will be described in detail. In each set 23, a pair of wheels 24 are mounted on an axle 25 secured at the trailing end of an elongated wheel support arm 26. The forward end of the support arm 26 carries a pin 27 that is slidably fitted in a collar 28 pivoted on a horizontal axis between lugs 29 extending down from beneath the frame arm 22. The pivoting and sliding fit between the pin 27 and the collar 28 provides the required swinging and sliding connection between the wheel support arm 26 and the frame arm 22.

In carrying out the invention, hydraulic struts 31 are mounted on the ends of the frame arms 22 and connected to the wheel support arms 26 to raise and lower the frame. Each strut 31 includes a cylinder portion 32 fixed rigidly on the end of the frame arms 22 and an extensible piston portion 33 having a ball and socket connection 34 with the underlying wheel support arm 26. Control of fluid to the struts 31 thus raises and lowers the frame 20 with respect to the wheel sets 23, swinging the vehicle 10 about a horizontal axis defined by the front axle of the tractor 11. The raised and lowered positions of the frame 20 are respectively shown in solid lines in FIGS. 1 and 4.

A feature of the invention lies in using airplane type balloon tires for the wheels 24. Tires of this type are compact, being only approximately 16 inches wide and 44 inches in diameter. The load carrying ability and resistance to heat, required of such tires by jet aircraft, make them particularly suitable for the present application. Moreover, such tires are much more economical than the large off-the-road type tires normally associated with equipment of the present kind.

In accordance with the invention, a pair of pot engaging members 40 are floatingly mounted on the frame 20 for engaging and releasably locking pairs of trunnions 41 which extend laterally of the pot P. The floating mounting of the members 40 permits the vehicle 10 to pick up or lower the pot, rest the pot on the frame 20 for transport, or tilt the pot to a dumping position as shown in dashed lines in FIG. 1. In the illustrated construction, the members 40 are defined by opposed channels having forward end walls 42 and being rigidly connected as parts of an integral U-shaped cradle 43 fitted within the frame 20. Since each of these channel members 40 are alike, only one will be described in detail. The rear ends of the channel members 40 are flared at 44 and joined by a stub shaft and slot connection to the ends of the frame arms 22. Preferably, a stub shaft 45 is fixed at its center in a plate 46 secured to the underside of the member 40. Each projecting end of the stub shaft 45 is received in a generally vertical slot 47 formed in plates 48 that sandwich the member plate 46 and are fixed to the frame arm 22 by a tube 49 anchored in the box-like arm 22 and a brace 50.

With the stub shaft 45 in the bottom of the slots 47, a pivot axis is defined about which the member 40 can be swung to tilt and dump the pot P, the position of the parts shown in dashed lines in FIG. 1. Movement of the stub shaft 45 upwardly in the slots 47 allows the member 40 to lift up from the frame 20 and maintain a substantially horizontal position so as to pick up or set down the pot P when the frame 20 is lowered by the struts 31, the position of the parts shown in solid lines in FIG. 4. Preferably, the plate 46 is formed with an arcuate abutment surface 52 engageable with the tube 49, and abutment blocks 53 are mounted on the top of the frame arm 22 beneath the front of the member 40 so that the surface 52 and the abutment block 53 support the member 40 in generally horizontal relation when the frame 20 is raised by the struts 31. When the member 40 is so supported, the stub shaft 45 lifts slightly from the bottom of the slots 47 so that transport loads are not borne by the pin and pivot connection provided between the member 40 and the frame 20.

In order to releasably lock the pot P onto the members 40, each member 40 supports a lock bar 55 pivoted on a pin 56 so as to be cammed up when the pot trunnions 41 enter the channel members 40. With the trunnions in place against the end walls 42, the lock bar 55 drops down and blocks reverse movement of the trunnions. A small unlocking actuator 57 is connected between the bar 55 and the top of the member 40 for selectively swinging the lock bar up when it is desired to release the pot.

For tilting and dumping the pot P, actuators 60 are coupled between each of the members 40 and the frame arms 22. Again, the arrangement and construction of the two actuators, one on either side, are identical so only one will be described in detail. In the illustrated construction, the piston rod of the actuator 60 is secured to a lug 61 fixed beneath the member 40, and the cylinder portion of the actuator 60 is pivoted between the inner wall of the frame arm 22 and a bracket plate 62 that is supported by a pair of tubes 63 anchored in the box-like arm 22 (see FIG. 3). Applying hydraulic fluid under pressure to the actuator 60 extends the piston rod portion of the actuator and swings the members 40 from the solid line to the dashed line positions shown in FIG. 1; the members tilting about the axis defined by the stub shaft 45 resting in the bottom of the slots 47.

Figure 5:
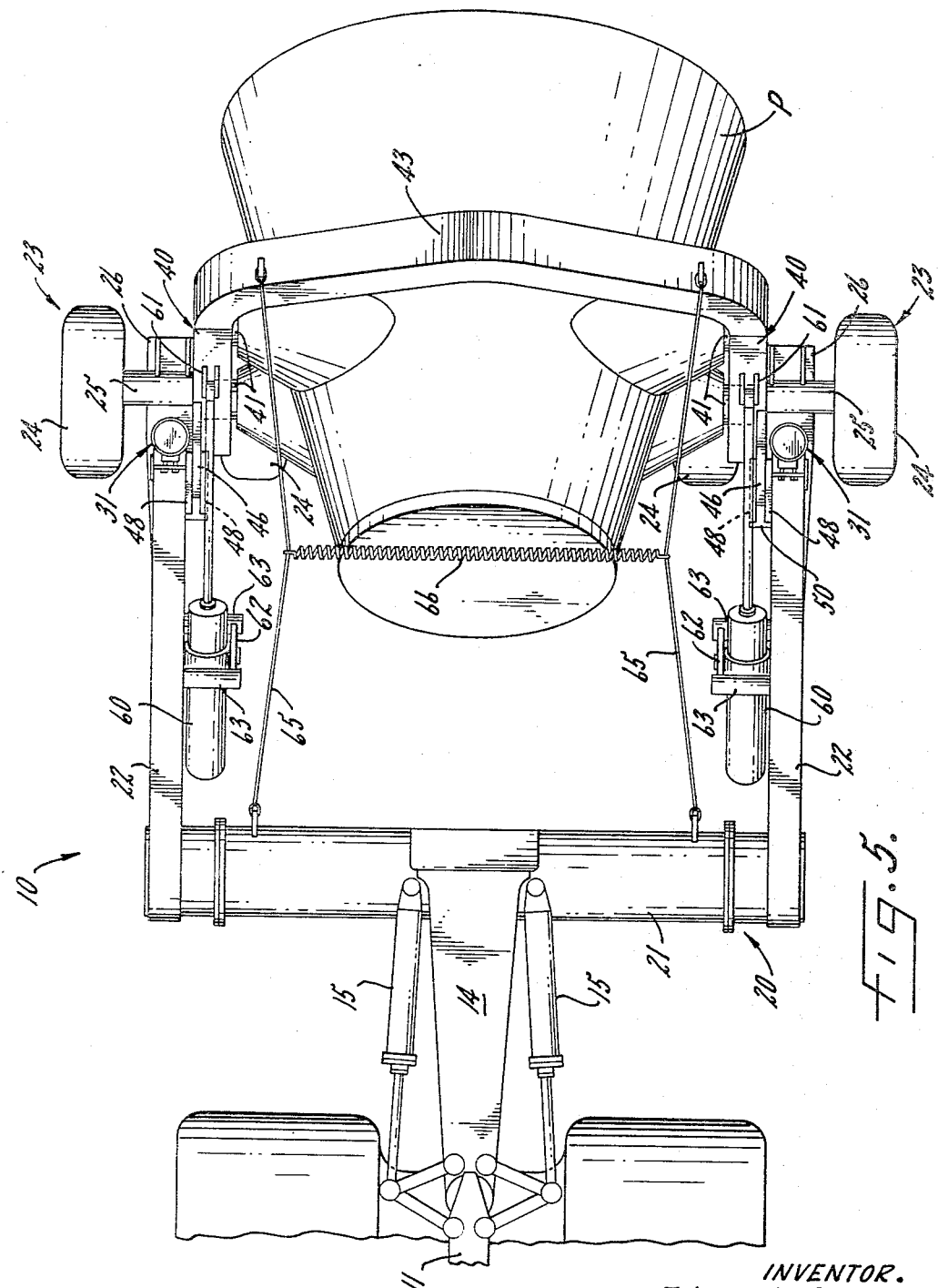
FIG. 5 is a plan of the vehicle shown in FIG. 1.

To cushion the dumping movement and restrict the angle to which the pot is tilted, a pair of cables 65 are connected between the cradle 43 and the frame 20 so that the cables tend to pull into parallel relation as the pot is tilted (see particularly FIG. 5). A strong extensible spring 66 is connected between the cables at their approximate center. The cables 65 limit tilting of the pot and the springs 66 resist bringing the cable into full parallel relation. Thus, the geometry is such that the force of the spring 66 is greatly magnified giving a resilient cushioning effect to the dumping action of the vehicle 10 even though very heavy loads are handled. The actuator 60 is thus protected by the cables 65 serving as a light, inexpensive, dependable and high mechanical advantage stop.

Operation of the vehicle 10 will be readily apparent from the above description. When a pot P is first encountered it rests solidly on the ground or floor surface, as shown in solid lines in FIG. 4. The vehicle 10 is maneuvered by the tractor 11 so that the frame 20 embraces the pot, and trunnions 41 are received in the flared ends 44 of the floatingly mounted support members 40. This lifts the support members 40 upwardly into generally horizontal alinement with the pair of trunnions on either side of the pot, with the stub shafts 45 rising freely in the slots 47 so that the members 40 can slide easily over the pot trunnions. When the end walls 42 strike the trunnions, the lock bars 55 will have fallen in place and the pot is then secured to the vehicle 10. Supplying hydraulic fluid under pressure to the struts 31 lifts the frame 20 with respect to the ground engaging wheels 24 so that the pot is tilted to the position shown in dashed lines in FIG. 4 and then lifted to the solid line position shown in FIG. 1 with the surfaces 52 and the blocks 53 supporting the weight of the load. The pot can be readily transported to the desired location and, upon energizing of the actuators 60, dumped of its contents with the parts assuming the dashed line position shown in FIG. 1.

The freely fitting stub shafts 45 in the slots 47 give the members 40 a self-alining capability. Independent actuation of the struts 31 allows the operator to compensate for uneven positioning of the pot on a surface which is not level.

I claim as my invention:

1. A pot handling trailer comprising, in combination, a generally U-shaped frame having ends adapted to embrace a pot, wheel supports mounted for up and down movement on said frame, ground engaging wheels on said supports, hydraulic struts mounted on said frame ends and connected to said supports so as to raise and lower said frame relative to said wheels, a pair of pot engaging members disposed respectively on the ends of said frame, means for releasably locking a pot onto said members, said frame and said members having interengaging abutment surfaces for supporting said members in generally horizontal relation when the frame is raised by said struts, and means for pivoting said members about a horizontal axis extending between said frame ends.

2. The combination of claim 1 in which said wheels include a pair of airplane type balloon tires mounted on each of said supports.

3. A pot handling trailer comprising, in combination, a generally U-shaped frame having ends adapted to embrace a pot, wheel supports mounted for up and down movement on said frame, ground engaging wheels on said supports, hydraulic struts mounted on said frame ends and connected to said supports so as to raise and lower said frame relative to said wheels, a pair of pot engaging members disposed respectively on the ends of said frame, said members defining the ends of an integral U-shaped cradle generally fitting in said U-shaped frame, means for releasably locking a pot onto said members, said frame and said members having interengaging abutment surfaces for supporting said members in generally horizontal relation when the frame is raised by said struts, and means for pivoting said members about a horizontal axis extending between said frame ends.

4. A pot handling trailer comprising, in combination, a generally U-shaped frame having ends adapted to embrace a pot, wheel supports mounted for up and down movement on said frame, ground engaging wheels on said supports, hydraulic struts mounted on said frame ends and connected to said supports so as to raise and lower said frame relative to said wheels, a pair of pot engaging members disposed respectively on the ends of said frame, means for releasably locking a pot onto said members, said frame and said members having interengaging abutment surfaces for supporting said members in generally horizontal relation when the frame is raised by said struts, and means for pivoting said members about a horizontal axis extending between said frame ends, said pivot means being formed to permit said members to lift from said axis to a generally horizontal position when the frame is lowered by said struts.

5. A pot handling trailer comprising, in combination, a generally U-shaped frame having ends adapted to embrace a pot, a pair of axle supporting arms pivoted on said frame for up and down movement, a pair of axles supported respectively by said arms in axially spaced, generally aligned relation beneath the ends of said frame, ground engaging wheels mounted on said axles, hydraulic struts mounted on said frame ends and connected to said arms so as to raise and lower said frame relative to said wheels, a pair of pot engaging members disposed respectively on the ends of said frame, said frame and said members having interengaging abutment surfaces for supporting said members in generally horizontal relation when the frame is raised by said struts, and means for pivoting said members about a horizontal axis extending between said frame ends.

6. A pot handling trailer comprising, in combination, a generally U-shaped frame having ends adapted to embrace a pot, wheel supports mounted for up and down movement on said frame, ground engaging wheels on said supports, hydraulic struts mounted on said frame ends and connected to said supports so as to raise and lower said frame relative to said wheels, a pair of opposed pot trunnion receiving channels disposed respectively on the ends of said frame, said channels having open flared ends for camming about pot trunnions when the tractor frame is lowered by said struts and rolled about a pot, said frame and said members having interengaging abutment surfaces for supporting said members in generally horizontal relation when the frame is raised by said struts, and means for pivoting said members about a horizontal axis extending between said frame ends.

7. The combination of claim 6 including a pair of lock bars pivoted respectively on said channels so as to drop behind pot trunnions received in said channels and thus lock a pot in said channels, and a pair of lock actuators mounted respectively on said channels and connected to said bars for selectively lifting said bars to remove the trunnions from the channels.

8. A pot handling trailer comprising, in combination, a generally U-shaped frame having ends adapted to embrace a pot, wheel supports mounted for up and down movement on said frame, ground engaging wheels on said supports, hydraulic struts mounted on said frame ends and connected to said supports so as to raise and lower said frame relative to said wheels, a pair of pot engaging members disposed respectively on the ends of said frame, means for releasably locking a pot onto said members, said frame and said members having interengaging abutment surfaces for supporting said members in generally horizontal relation when the frame is raised by said struts, a stub shaft and slot pivot connection between each of said members and said frame, said stub shafts being loose in said slots when said abutment surfaces are interengaged, said pivot connections defining a horizontal axis for said members between said frame ends, and said slots permitting said members to lift from said axis to a generally horizontal position when the frame is lowered by said struts.

9. In an apparatus having a pot carrying cradle pivoting on a frame for tilting and thus emptying a pot, the combination comprising, a pair of cables extending between said frame and said cradle so that the cables tend to pull into parallel relation upon tilting of the cradle, and an extendible spring connected between the center portions of said cables to resiliently resist straightening of the cables.

References Cited
UNITED STATES PATENTS

| | | | |
|---|---|---|---|
| 2,672,247 | 1/1954 | Jewett | 214—314 |
| 3,112,835 | 12/1963 | Gierhart | 214—313 |
| 3,192,875 | 7/1965 | Kroeger et al. | 214—308 X |
| 3,197,229 | 7/1965 | Houlton | 214—394 X |
| 3,223,257 | 12/1965 | Kinkopf | 214—314 X |
| 3,237,988 | 1/1966 | Esgate | 298—5 |

FOREIGN PATENTS 203,878  6/1959  Austria.

HUGO O. SCHULZ, *Primary Examiner.*